United States Patent [19]
Jensen et al.

[11] Patent Number: 5,954,852
[45] Date of Patent: Sep. 21, 1999

[54] METHOD OF MAKING FIBERS FROM MINERAL MELTS WHICH HAVE A VISCOSITY OF NOT MORE THAN 18 POISE AT 1400° C.

[75] Inventors: Carsten Jensen; Svend Grove-Rasmussen, both of Roskilde, Denmark

[73] Assignee: Rockwool International A/S, Denmark

[21] Appl. No.: 08/849,424

[22] PCT Filed: Dec. 1, 1995

[86] PCT No.: PCT/EP95/04746

§ 371 Date: May 30, 1997

§ 102(e) Date: May 30, 1997

[87] PCT Pub. No.: WO96/16912

PCT Pub. Date: Jun. 6, 1996

[30] Foreign Application Priority Data

Dec. 1, 1994 [GB] United Kingdom .................. 9424331

[51] Int. Cl.$^6$ .................................................. C03B 37/01
[52] U.S. Cl. ................. 65/377; 65/382; 65/469
[58] Field of Search .............................. 65/469, 382, 377; 501/36

[56] References Cited

U.S. PATENT DOCUMENTS

| | | |
|---|---|---|
| 2,632,919 | 3/1953 | Koehler . |
| 4,026,478 | 5/1977 | Albert ........................................ 65/469 |
| 5,332,699 | 7/1994 | Olds .......................................... 501/36 |
| 5,401,693 | 3/1995 | Bauer ........................................ 501/36 |

FOREIGN PATENT DOCUMENTS

| | | |
|---|---|---|
| 92/06047 | 4/1992 | WIPO . |
| 92/12939 | 8/1992 | WIPO . |
| 92/12941 | 8/1992 | WIPO . |

*Primary Examiner*—John Hoffmann
*Attorney, Agent, or Firm*—Ostrolenk, Faber, Gerb & Soffen, LLP

[57] ABSTRACT

Man made vitreous fibers are made using a cascade of rotors (4, 5, 6, 7) from melt poured onto the top rotor (4) wherein the melt has a low viscosity (not more than 18 poise) at 1400° C. and has a viscosity of not more than 10 poise on the top rotor (4), the top rotor has an acceleration field of at least 30 km/sec$^2$, and the second rotor (5) is arranged with its center on a line with the center of rotor (4) which makes an angle C of 0–20° and has an acceleration field of 50 to 150% of the field of the rotor (4), and the subsequent rotors (6, 7) have an acceleration field of 120 to 250% of the acceleration field of the rotor (4).

20 Claims, 1 Drawing Sheet

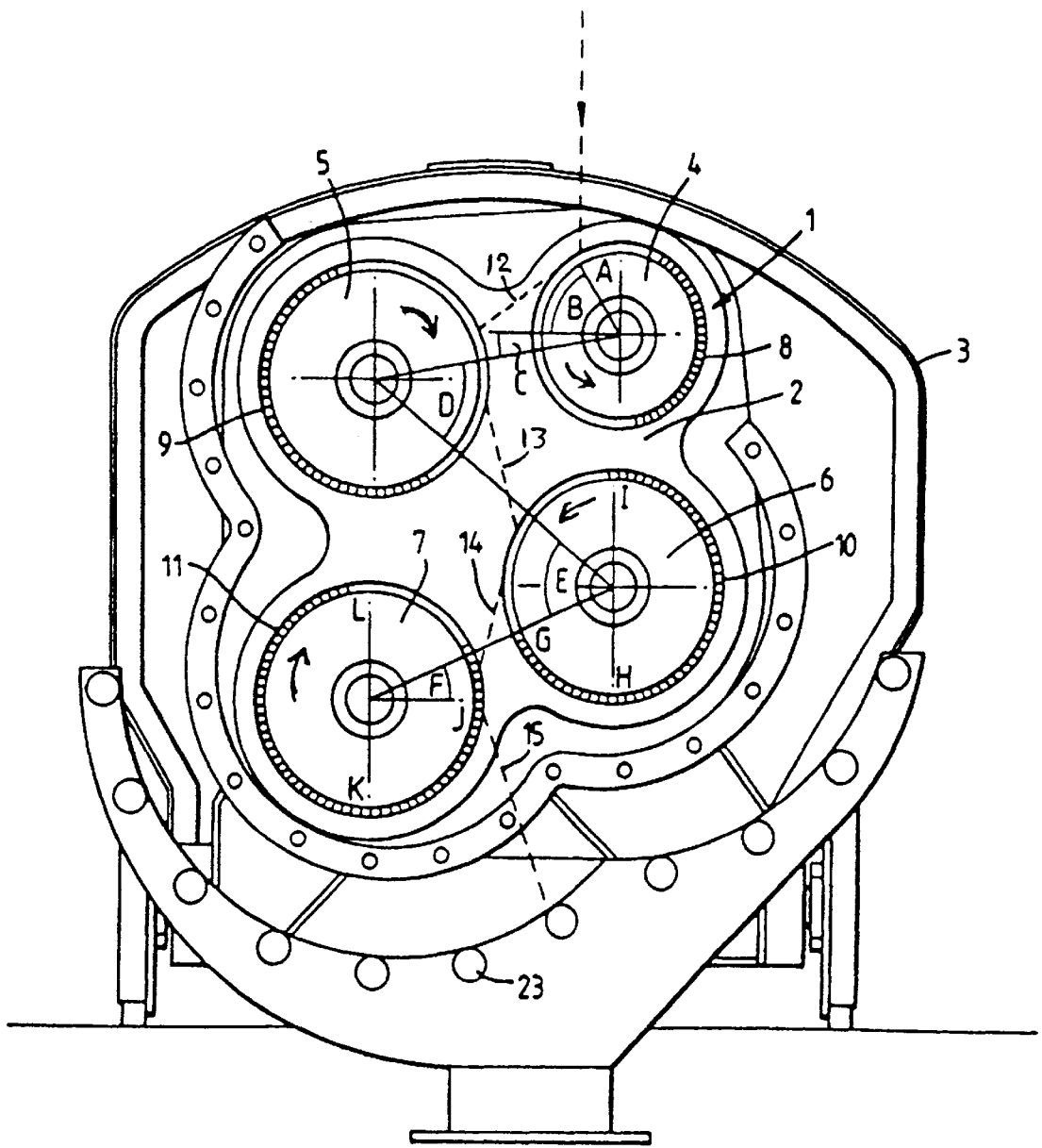

METHOD OF MAKING FIBERS FROM MINERAL MELTS WHICH HAVE A VISCOSITY OF NOT MORE THAN 18 POISE AT 1400° C.

This invention relates to processes by which Man-Made Vitreous Fibre products (MMVF products) can be made. Such products include slabs, sheets, tubes and other shaped products of use as thermal or fire insulation or protection, noise reduction or regulation, or a fibre reinforcement of cement, plastics or other materials, or a filler, or as horticultural growing medium.

It is well known to make MMVF products from a mineral melt by pouring mineral melt on to the top rotor of a cascade of rotating rotors each mounted about a different substantially horizontal axis and arranged such that the melt is thrown from the top rotor on to the subsequent rotor, or each subsequent rotor in sequence, in the cascade so as to throw fibres off the or each subsequent rotor, collecting the fibres as a batt (generally in the presence of binder), and consolidating the batt into the desired MMVF product. Suitable apparatus is described in WO92/06047.

In conventional processes using conventional melts, the acceleration field on the top rotor is typically very low, for instance 10 to 15 km/sec$^2$ and is intended primarily to accelerate the melt on to the subsequent second rotor where the acceleration field is much higher.

Thus typically the process is operated with an acceleration field of around 15 km/sec$^2$ on the top rotor and 30 to 100 km/sec$^2$ on the subsequent rotors, with the highest value being for the last rotor.

It is desirable to minimise the amount of shot (material having a diameter above 63 μm) in the MMVF product and to obtain a reasonably uniform fibre diameter in the product. This is why it has been conventional to arrange for the top rotor to provide an acceleration force very much less than the acceleration force provided by the subsequent rotors. Thus it has been accepted that satisfactory fibre formation by the top rotor would be difficult to achieve and would be likely to be accompanied by significant shot formation, so that the top rotor should primarily serve to accelerate the melt that is to be thrown against the first subsequent rotor, with fibre formation being confined primarily to the subsequent second and later rotors.

Such processes are suitable for mineral melts of the type which have traditionally been used for making MMVF products, especially from rock, stone or slag. Other processes which are also intended for use with conventional melts are described in WO92/12939 and WO92/12941. For instance we describe in WO92/12939 that the first rotor is provided with driving means and has a size such that it can rotate to give an acceleration field of at least 50 km/s$^2$ and the second and third rotors each have a size and can rotate such as to give a greater acceleration field than the first rotor, and the axes of the first and second rotors are arranged such that a line drawn from the axis of the first rotor to the axis of the second rotor makes an angle of from 0 to 20° C., preferably 5 to 10°, below the horizontal. In this apparatus, the acceleration field provided by the first rotor can be up to around 150 km/s$^2$, or even greater in some circumstances, but is generally below 100 km/s$^2$. The ratio of the acceleration field of the second rotor to the first rotor is generally from 1.1:1 to 2:1, preferably around 1.2:1 to 1.7:1 and the ratio of the acceleration field on each subsequent rotor to the preceding rotor is generally 1.2:1 to 1.6:1. The acceleration field provided by the final rotor typically is from 150 km/s$^2$ to 300 km/s$^2$, or even greater in some instances.

All such processes are intended for use with conventional melts having conventional melting properties. Such melts contain, for instance, significant amounts of alumina and are formed from materials such as basalt and diabase. The literature generally describes such melts as being applied on to the top rotor while at a temperature in the range 1350 or 1400° C. to 1600° C., but in practice it is normal to apply at a temperature of around 1420 to 1480° C. The use of higher temperatures on the top rotor results in the melt having too low a viscosity on the top rotor for satisfactory production quality.

The melt cools as it is thrown from one rotor to the next and the fluid viscosity increases significantly as the temperature drops. For instance, with a conventional melt, the viscosity (in poise) may double when the temperature drops from 1450° C. to 1400° C. It is therefore normally necessary to select conditions such that the temperature drop between contact with the top rotor to departure from the last subsequent rotor is not more than about 200° C. In particular, the temperature on the last rotor must be sufficiently high that the melt is still sufficiently molten to form fibres. Typically the viscosity of the melt as it reaches the top rotor is at least 15 poise, and often at least 30 poise, and when it leaves the last rotor it should not be more than, for instance, around 200 poise. In particular, the temperature when it leaves the last rotor should be above the crystallisation point of the melt.

It is convenient to define a melt in terms of its viscosity at 1400° C., and on this basis conventional melts used in the described processes normally have a viscosity of at least 20, typically 25 to 40, poise at 1400° C.

It will be appreciated that it is necessary to formulate the melt carefully from the various minerals of which it is formed so as to achieve a melt having the desired viscosity-temperature relationship.

It is known that varying the components of the melt can vary the physical properties such as fire resistance and heat insulation of the MMVF products made by the process, but the formulation of the melt has usually been dictated primarily by the need to achieve the desired viscosity-temperature relationship.

There is currently a desire in the industry to formulate the melt with particular chemical and solubility properties, for instance solubility in Gamble's solution, typically at pH 7.5. For instance, some such fibres are made with an analysis that is very low in aluminium and which includes some phosphorous. Many of the melts which are now of commercial interest, for instance because of their solubility properties, have a lower viscosity at 1400° C. than conventional melts. This reduction in melt viscosity might be expected to facilitate the formation of products, but we have found that operating the cascade spinner under conditions similar to or the same as any of the conditions described above does, in practice, lead to a product which has an unacceptably high proportion of shot and/or an unacceptably low average fibre diameter. It is therefore our object to provide a process for making MMVF products by a cascade of rotors and which can give good products when the melt has unusually low melt viscosity at 1400° C.

It might have been expected that if any modification was to be made to conventional and known processes to adapt them for these low viscosity melts, one modification might have been to reduce the temperature of the melt on the first rotor, so as to raise the viscosity of the melt on the first rotor back to values typical of those which have been conventionally used. Another possible modification might have been to reduce the acceleration field, so as to achieve equivalent fiberisation despite the lower viscosity. However, neither of these modifications is satisfactory and, in the invention, we do exactly the opposite.

According to the invention, we provide a process for making MMVF product from mineral melt using a cascade of rotating rotors which comprises a top, first, rotor and subsequent rotors wherein the rotors are mounted on different horizontal axes and are arranged such that melt poured on to the top rotor is thrown from that on to the subsequent, second, rotor and from that on to the remaining subsequent rotor or rotors and is thrown from the subsequent rotors as fibres, and the process comprises pouring melt on to the top rotor and collecting the fibres thrown off the rotors, and the process is characterised in that the melt viscosity of the melt at 1400° C. is not more than about 18 poise, the melt viscosity of the melt on the top rotor is not more than about 10 poise, the acceleration field on the top rotor is at least about 30 km/sec$^2$, the acceleration field on the second rotor is about 50 to 150% of the acceleration field on the top, first, rotor, the acceleration field on the third and any other subsequent rotor is about 100 to 250% of the acceleration field of the first rotor, and the axes of the first rotor and the second rotor are arranged such that a line drawn from the axis of the first rotor to the axis of the second rotor makes an angle of about 0 to 20° below the horizontal.

It is easily possible, by the invention, to provide MMVF products in which the proportion of shot having diameter above 63 μm is below 35% by weight of the inorganic material. Further, it is easily possible to operate the process so that the fibre diameter is mainly in the range 2 to 5 μm, and to obtain products having very satisfactory insulation values (for a given density) and very satisfactory density values at standard air resistance.

Although the use of a first (top) rotor having an acceleration fields of at least 50 km/sec$^2$ is described in WO92/12939 and WO92/12941, there is no suggestion that they would be useful for the particular melts in the invention nor that they should be arranged with the particular relationship of acceleration fields and melt properties defined in the invention.

The melts to which the invention is applied generally have a viscosity at 1400° C. of not more than 15 poise, and preferably not more than 13 poise. Generally it is at least 3 poise, often at least 5 poise and frequently at least 9 poise. In this specification, melt viscosity is determined in accordance with American Journal Science Volume 272, 1972, pages 438 to 475.

The top, first, rotor is operated at a melt temperature which is above 1400° C., with the result that the viscosity of the melt on the top rotor is lower than the viscosity at 1400° C. As a result, the viscosity on the top rotor is very much less than is conventional. Whereas conventional processes operate at, for instance, a viscosity of at least 20 poise on the top rotor, in the invention the value is below 10 poise and often below 8 poise and most usually below 6 poise. It can be as low as 1 poise, but usually it is above 3 poise.

The temperature of the top rotor is selected such that the melt has the desired low viscosity on the top rotor and in practice this generally means that the top rotor, and the melt on it, should be at a temperature of 1480 to 1600° C. Usually the temperature is at least 1490° C., most preferably at least 1500° C. Usually it is not more than 1550° C.

In this specification, when we refer to the temperature or viscosity on a rotor we refer to the average temperature or viscosity of the melt measured in the region extending from 0 to 10 cm up from the rotor.

The acceleration field on the top rotor must be higher than usual and so must be at least 30 km/sec$^2$. Usually it is at least 35 km/sec$^2$. Preferably it is below 48 km/sec$^2$ although in some processes it can be higher, for instance up to 70 to even 100 km/sec$^2$. However values above 48 km/sec$^2$ are usually undesirable.

In conventional processes, and the process in WO92/12939 and WO92/12941, the acceleration field on the second rotor is considerably more than the acceleration field on the first, top, rotor. It is a feature of the invention that the acceleration field on the second rotor can often preferably be less than the acceleration field on the first rotor and, if it is greater, it should not be too much greater than the acceleration field on the first rotor. This gives improved results since it provides for good fibre formation on this and subsequent rotors despite the relatively high speed on the top rotor and the low viscosity of the melt. The acceleration field on the second rotor is usually at least 50%, and preferably at least 70% or 80%, of the acceleration field on the first rotor. It can be as much as 150%, but usually not more than 130% or, preferably, 110% of the acceleration field on the first rotor.

The acceleration field on the third rotor and any subsequent rotor, is usually from 100 to 250% of the acceleration field on the first rotor. Usually it is at least 120% and preferably at least 150% of the field on the first rotor. It can be above 200% but it is usually sufficient for it to be up to 180% of the field on the first rotor. Another way of defining the acceleration field on the third and any subsequent rotor is by reference to the field on the second rotor. On this basis, the field on the third and any subsequent rotor is usually at least 130%, and preferably at least 170%, of the field on the second rotor but is usually not more than 300%, and often not more than 230%, of the field on the second rotor.

In particular, the acceleration field on the second rotor is usually at least 20 or 25 km/sec$^2$ and preferably at least 30 km/sec$^2$. It can be as much as 100 km/sec$^2$ but is generally below 70 and preferably below 50 km/sec$^2$. The acceleration field on the third and any subsequent rotor is generally at least 40 and preferably at least 50 km/sec$^2$. It can be as much as 100 km/sec$^2$ but is preferably not more than 80 km/sec$^2$.

The diameter of the top rotor is preferably in the range 130 to 230 mm, most preferably in the range 160 to 200 mm. The diameter of the second rotor is generally in the range 150 to 300 mm, preferably around 200 to 250 mm. The diameter of the third, and any subsequent, rotor is generally 250 to 400 mm, preferably around 300 to 350 mm.

Usually there are four rotors.

The acceleration field, or the centripetal acceleration, of a rotor is the field G where $G = r\Omega^2$ where r is the radius of the rotor and $\Omega$ is the angular velocity of the rotor where $$\Omega = \frac{2\pi n}{60}$$

where n is the revolutions per minute.

The axis of the first subsequent rotor is positioned such that a line drawn from the axis of the top rotor to the axis of this first subsequent rotor makes an angle of about 0 to 20° below the horizontal. Preferably this angle is about 5 to 10 or 15°. This is particularly suitable when, as is preferred, the melt strikes the first or top rotor at a position that makes an angle of 40 to 60°, preferably 45 to 60°, above that horizontal. Thus the melt travels through an angular distance generally of 45 to 80°, preferably 50 to 70°, from the point at which it strikes the top rotor to the line joining the axes of the top and second rotors.

Preferably each of the subsequent rotors, and often also the first rotor, is provided with an air slot adjacent to it where the internal diameter of the slot is substantially the same as the external diameter of the periphery of the rotor and air is blasted through the slot in an axial direction or may emerge from the slot with tangential and velocity components. Each air slot can consist of inner and outer slots. Blades in a slot, or other direction means, can be arranged to direct the air at an angle to the axial direction that varies along the length of the slot. Accordingly it is possible to direct the air, as required, in any chosen axial, radial or tangential direction. Reference can be made to WO92/06047 and WO92/12939 for information about suitable air flows.

The fibres may be converted to MMVF products in conventional manner. Thus binder may be applied to the fibres during or after their formation and the fibres may be collected as a batt on a permeable screen and this batt may be converted to the desired product by conventional techniques such as lamination, calendering, transverse compression and longitudinal compression, and curing. The products are of particular value as thermal, fire or acoustic insulation or protection or regulation.

The overall process conditions used in the process, including the selection of the components of the melt, are preferably such that the amount of shot having a fibre diameter above 63 $\mu$m is below 35% and most preferably below 30%, by weight of the inorganic material. Usually it is above 20% by weight.

As a result of operating the process in accordance with the defined conditions, it is possible to obtain a product having a suitable fibre diameter, without risk of the fibre diameter being so small that the fibres break prematurely and give an inferior product. The fibre diameter is generally mainly in the range 2 to 5 $\mu$m. Usually it is at least 2.5 $\mu$m but not more than 4 $\mu$m. Preferred products according to the invention have a fibre diameter in the range 2.5 to 3.5 $\mu$m. In this specification, fibre diameter is the average fibre diameter measured by SEM according to the length based measuring method as defined by the organisation TIMA Analytical Chimica Acta, 1993, pages 280 to 288 "Fibre diameter measurement of bulk man made vitreous fibre". The geometric spread is preferably about 2.

The invention can result in high efficiency of MMVF production typically above 85%. Thus less than 15% of the initial melt is wasted and recycled.

It is well known that a disadvantage of MMVF products made from rock, slag and similar materials is that they tend to have an insulation value, per unit density, that is not as satisfactory as the insulation value, per unit density, of MMVF made from glass. An advantage of the invention is that it is possible to obtain very satisfactory insulation values. In particular, it is possible by the invention easily to obtain MMVF product made from a non-glass melt in which the density range over which any particular thermal conductivity lambda value is obtained can be very satisfactory. Thus, by the invention, it is possible to make MMVF products in which the relationship between any particular lambda value and the range of densities over which this can be conveniently obtained is as set out in the following table. Lambda is measured in MW/m° K and density in kg/m³.

| Lambda | Max. Density | Min. Density |
|---|---|---|
| 40 | 22 | 20 |
| 38 | 25 | 23 |
| 36 | 30 | 38 |
| 34 | 40 | 37 |
| 33 | 55 | 47 |

Intermediate values are calculated by interpolation.

The invention is primarily of value when the melt is of the type generally referred to as a rock, stone or slag melt, in contrast to a glass melt. Generally therefore the total content of alkali metal (expressed as $Na_2O+K_2O$) is below 15% and generally below 10%, and the total amount of $CaO+MgO$ is at least 15% and usually at least 20%.

The invention is of particular value when the melt is formulated so as to give increased solubility in Gamble's Solution at pH 7.5. It has been proposed that melts for giving good solubility in such fluids should have a K value of at least 30, and preferably at least 40, where K is calculated from the weight percentage of certain oxides, as follows:

$$K = CaO + MgO + Na_2O + K_2O + BaO + B_2O_3 - 2 \times (Al_2O_3)$$

The following table sets out analyses for a range of the main components, by weight %, of typical products, wherein products 6 and 7 are conventional products made by blending basalt and diabase.

| Melt | $SiO_2$ | $Al_2O_3$ | $TiO_2$ | FeO | CaO | MgO |
|---|---|---|---|---|---|---|
| 1 | 54.2 | 1.5 | 0 | 0.5 | 29.5 | 8.7 |
| 2 | 50.8 | 2.0 | 0 | 0.5 | 30.5 | 9.9 |
| 3 | 49.1 | 0.8 | 0.1 | 0.6 | 29.9 | 16.4 |
| 4 | 53.2 | 2.1 | 0.2 | 4.5 | 22.5 | 12.5 |
| 5 | 53.5 | 2.0 | 0.1 | 6.0 | 23.2 | 11.0 |
| 6 | 47.6 | 12.2 | 1.8 | 6.9 | 14.3 | 11.7 |
| 7 | 48.5 | 12.8 | 1.9 | 6.6 | 13.1 | 11.3 |

| | | | | Viscosity (poise) | |
|---|---|---|---|---|---|
| Melt | $Na_2O$ | $K_2O$ | K value | 1400° C. | 1500° C. |
| 1 | 4.8 | 0.8 | 40.8 | 13 | 4.3 |
| 2 | 4.6 | 0.7 | 41.7 | 11 | 4.6 |
| 3 | 1.0 | 0.2 | 44.7 | 9 | 3 |
| 4 | 3.5 | 0.8 | 33.6 | 10.7 | 5.4 |
| 5 | 2.0 | 0.8 | 33.0 | 12.3 | 6.0 |
| 6 | 2.4 | 1.1 | <30 | 28 | 13 |
| 7 | 2.4 | 1.1 | <30 | 35 | 18 |

The invention is now described with reference to the accompanying drawing which is a front view of a cascade of rotors assembled for use in the invention.

The apparatus includes a cascade 1 of rotors each mounted on the front face 2 of a housing 3. The cascade is located at one end of a conventional fibre-collecting chamber, with the top rotor 4 positioned to receive melt from a melt furnace. Each rotor is mounted in conventional manner on a driven axle that allows it to be rotated at high peripheral speed. The set consists of four rotors, a top rotor 4 that rotates anti-clockwise, and three subsequent fiberising rotors, namely a second rotor 5 that rotates clockwise, a third rotor 6 that rotates anti-clockwise, and a fourth rotor 7 that rotates clockwise. The bearings and drive mechanisms are not shown.

Air slots 8, 9, 10 and 11 are associated with, respectively, the rotors 4, 5, 6 and 7, each slot extending around part only of the rotor. Generally each slot extends around at least ⅓ of the periphery of its associated rotor, generally around the outer part of the set of rotors. Generally it extends around not more than ⅔ or ¾ of the periphery. Each slot leads from an air supply chamber within the housing Molten mineral melt is poured on to the rotor 4 along the path illustrated and strikes the top rotor 4 at point A that is at a position such that the angle B (i.e., the angle that A makes with the horizontal towards the second rotor) is from 40 to 65° to the horizontal, often around 45 to 60° to the horizontal. The second rotor 5 should be positioned at or only slightly below the first rotor and so the angle C typically is from 0 to 20°, often around 5 to 10°.

By this means, it is possible to ensure that melt that is thrown off the first rotor on to the second rotor impacts on the peripheral surface of the second rotor substantially at right angles (e.g., from 75 to 105° to the normal). Similarly, it is preferred that the sun of angles D, E and F should be as low as possible. F is the included angle between the horizontal and the line joining the axes of the third and fourth rotors, E is the included angle between the lines joining the axes of the third and fourth rotors and the second and third rotors, while D is the included angle between lines joining the axes of the first and second rotors with the axes of the second and third rotors. Preferably C+D+E+F is below 150° but should generally be above 120°, and most preferably it is in the range 125 to 142°, with best results being obtained at around 135 to 140°.

Some of the melt striking the top rotor 4 at A is thrown off the rotor 4 as fibres but some is thrown on to subsequent rotor 5. Some of the melt is fiberised off that rotor whilst the remainder is thrown along path 13 on to subsequent rotor 6. A significant amount of this is fiberised off rotor 6, mainly in the area where there is slot 9, but some is thrown along path 14 on to the subsequent rotor 7. A significant amount is fiberised in the general direction 15 but melt is also fiberised around most of the remainder of the rotor surface in the area included by slot 10. Melt on rotor 7 is fiberised in the area included by the air slot 11.

Since the slots 8, 9, 10 and 11 do not extend around the entire periphery of each rotor, the air flow in the region of paths 12, 13 and 14 can be controlled and, indeed, can be substantially zero. Blades within the slots may be positioned at angles relative to the axial direction ranging typically from zero to 42°, for instance as described in WO92/06047.

The fibres that are formed on the rotors are carried away from the rotors, in a generally axial direction, partly as a result of the air that is forced through the slots and partly through other air that is travelling in the same general direction, for instance air introduced through the series of openings 23. Binder may be sprayed into the fibre cloud that is formed in the chamber, in conventional manner. The cloud of fibres may be collected on a suitable collecting support, often a permeable screen, in the base or the end of the chamber, in conventional manner, and may thus be carried out of the chamber.

As an example of the invention, melt 2 having the composition, K value and viscosity properties defined above was poured at a rate of 5 tons per hour onto a cascade of rotors as shown in the drawing. The top of first rotor 4 had a diameter of 185 mm and was rotated to give an acceleration field of 38 km/sec². The second rotor, rotor 5, had a diameter of 225 mm and was rotated to give an acceleration field of 32 km/sec². The third and fourth rotors, 6 and 7, each had a diameter of 330 mm and rotated to give acceleration fields of, respectively 65 and 69 km/sec². The temperature of the melt on the top rotor, 4, was 1490° C. and thus the melt had a viscosity of about 5 poise on a top rotor.

This process gave a product having an average fibre diameter between 2.5 and 3.5 μm and less than 35% by weight shots greater than 63μ with an efficiency of 85%.

We claim:

1. A process for making man Made Vitreous Fibres (MMVF) product from mineral melt using a cascade (1) of rotating rotors (4, 5, 6, 7) which comprises a first, top, rotor (4), a second rotor (5) and at least one subsequent rotor (6, 7) wherein the rotors are mounted on different horizontal axes, each rotating in a direction counter to the preceding rotor, and are arranged such that a melt poured on the top rotor (4) is thrown from that onto the second rotor (5) and from that onto the remaining subsequent rotor or rotors (6, 7) and is thrown from the subsequent rotors as fibres, and the process comprises pouring a melt of rock, stone or slag in which the total amount of CaO+MgO is at least 15 wt % and the total amount of $Na_2O+K_2O$ is below 10 wt % on to the top rotor 4 and collecting the fibres thrown of the rotors, and in which the melt viscosity of the melt at 1400° C. is not more than 1.8 Pa.s (18 poise), the melt viscosity of the melt on the top rotor is not more than 1 Pa.s (10 poise), the acceleration field on the top rotor is at least 30/sec², the acceleration field on the second rotor is 50 to 150% of the acceleration field on the top rotor (4), the acceleration field on any subsequent rotor (6, 7) is 120 to 250% of the acceleration field of the top rotor (4), and the axes of the first rotor (4) and the second rotor (5) are arranged such that a line drawn from the axis of the first rotor to the axis of the second rotor makes an angle C of 0 to 20° below the horizontal.

2. A process according to claim 1 in which the acceleration field on the top rotor is 30 to 48 km/sec².

3. A process according to claim 1 in which the acceleration field on the second rotor is 70 to 110% of the acceleration field on the top rotor.

4. A process according to claim 1 in which the acceleration field on each of the rotors is not more than 100 km/sec² and the acceleration field on each of the subsequent rotors is up to 200% of the acceleration field on the top rotor.

5. A process according to claim 1 in which the acceleration field on the top rotor is 30 to 70 km/sec², on the second rotor is 20 to 70 km/sec² and on the subsequent rotors is 40 to 80 km/sec².

6. A process according to claim 1 in which below 35% of the MMVP product is shot having diameter above 63 μm.

7. A process according to claim 1 in which the MMVF product has an average fibre diameter of 2.5 to 4 μm.

8. A process according to claim 1 in which the MMVF product has thermal conductivity lambda (MW/m° K) of 33–40 and lambda is related to density (kg/m³) as set out in the following table

| Lambda | Max. Density | Min. Density |
| --- | --- | --- |
| 40 | 22 | 20 |
| 38 | 25 | 23 |
| 36 | 30 | 38 |
| 34 | 40 | 37 |
| 33 | 55 | 47 | with intermediate values calculated by interpolation.

9. A process according to claim 1 in which the melt has a K value at least 40.

10. A process according to claim 1 in which the melt has a viscosity at 1400° C. of 0.3 to 1.5 Pa.s (3 to 15 poise).

11. A process according to claim 10 in which the melt has a viscosity at 1400° C. of 0.3 to 1.3 Pa.s (3 to 13 poise).

12. A process according to claim 10 in which the acceleration field on the top rotor is 30 to 48 km/sec$^2$.

13. A process according to claim 12 in which the acceleration field on the second rotor is 70 to 110% of the acceleration field on the top rotor.

14. A process according to claim 13 in which the acceleration field on each of the rotors is not more than 100 km/sec$^2$ and the acceleration field on each of the subsequent rotors is up to 200% of the acceleration field on the top rotor.

15. A process according to claim 14 in which the acceleration field on the top rotor is 30 to 70 km/sec$^2$, on the second rotor is 20 to 70 km/sec$^2$ and on the subsequent rotors is 50 to 80 km/sec$^2$.

16. A process according to claim 15 in which below 35% of the MMVP product is shot having diameter above 63 μm.

17. A process according to claim 16 in which the MMVP product has an average fibre diameter of 2.5 to 4 μm.

18. A process according to claim 17 in which the MMVF product has thermal conductivity lambda (MW/m° K) of 33–40 and lambda is related to density (kg/m$^3$) as set out in the following table

| Lambda | Max. Density | Min. Density |
|--------|--------------|--------------|
| 40     | 22           | 20           |
| 38     | 25           | 23           |
| 36     | 30           | 38           |
| 34     | 40           | 37           |
| 33     | 55           | 47           | with intermediate values calculated by interpolation.

19. A process according to claim 18 in which the melt has a K value at least 40.

20. A process according to claim 19 in which the melt has a viscosity at 1400° C. of 0.3 to 1.3 Pa.s (3 to 13 poise).

* * * * *